(12) United States Patent
Yang (10) Patent No.: US 6,834,002 B2
(45) Date of Patent: Dec. 21, 2004

(54) POWER FACTOR CORRECTION CIRCUIT (75) Inventor: Lee-Lung Yang, Chu-Pei (TW)

(73) Assignee: Entrust Power Co., Ltd. (TW)

( * ) Notice: Subject to any disclaimer, the term of this patent is extended or adjusted under 35 U.S.C. 154(b) by 0 days.

(21) Appl. No.: 10/355,135

(22) Filed: Jan. 31, 2003

(65) Prior Publication Data
US 2004/0151009 A1 Aug. 5, 2004

(51) Int. Cl.$^7$ ................................................ H02M 7/68
(52) U.S. Cl. .................... 363/89; 363/21.07; 363/21.15; 363/98
(58) Field of Search ................................ 363/17, 21.01, 363/21.02, 21.04, 37, 39, 40, 98, 132, 21.07, 21.12, 21.15, 89, 125

(56) References Cited

U.S. PATENT DOCUMENTS

| | | | | |
|---|---|---|---|---|
| 5,408,403 A | * | 4/1995 | Nerone et al. | 363/37 |
| 5,594,635 A | * | 1/1997 | Gegner | 363/124 |
| 6,181,583 B1 | * | 1/2001 | Okui et al. | 363/89 |
| 6,239,995 B1 | * | 5/2001 | Weng et al. | 363/37 |
| 6,266,256 B1 | * | 7/2001 | Lehnert et al. | 363/37 |
| 6,483,731 B1 | * | 11/2002 | Isurin et al. | 363/125 |

* cited by examiner

Primary Examiner—Michael Sherry
Assistant Examiner—Gary L. Laxton (57) ABSTRACT

A power factor correction circuit structure is described. The circuit connects a bridge rectifier and a first capacitor in series. The first capacitor, a winding and a first switching device are also connected in series. The first switching device is the low-side switching device in a bridge converter. The first switching device, a second switching device and a second capacitor are also connected in series, The second switching device is the high-side switching device in the bridge converter and the second capacitor is the boost capacitor in the PFC circuit. The winding can be one additional winding of the main transformer in the bridge converter or an independent inductor.

20 Claims, 11 Drawing Sheets

POWER FACTOR CORRECTION CIRCUIT

FIELD OF THE INVENTION

The present invention relates to a power factor correction circuit and more particularly, to a power factor correction circuit for improving a power factor of a switching power supply designed in bridge topologies in order to comply with the requirements of Class A or Class D as stipulated in harmonic current rules IEC-1000-3-2.

BACKGROUND OF THE INVENTION

Figure 1:
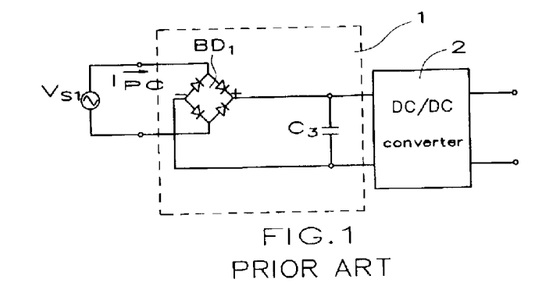
FIG. 1 is a circuit diagram of a prior art off-line switching power supply.

A typical switching power supply is shown in FIG. 1. The supply comprises an AC/DC rectifier 1, and a DC/DC converter 2 in which an electrolytic capacitor $C_3$ is connected as a filter for the bridge rectifier $BD_1$.

Figure 5:
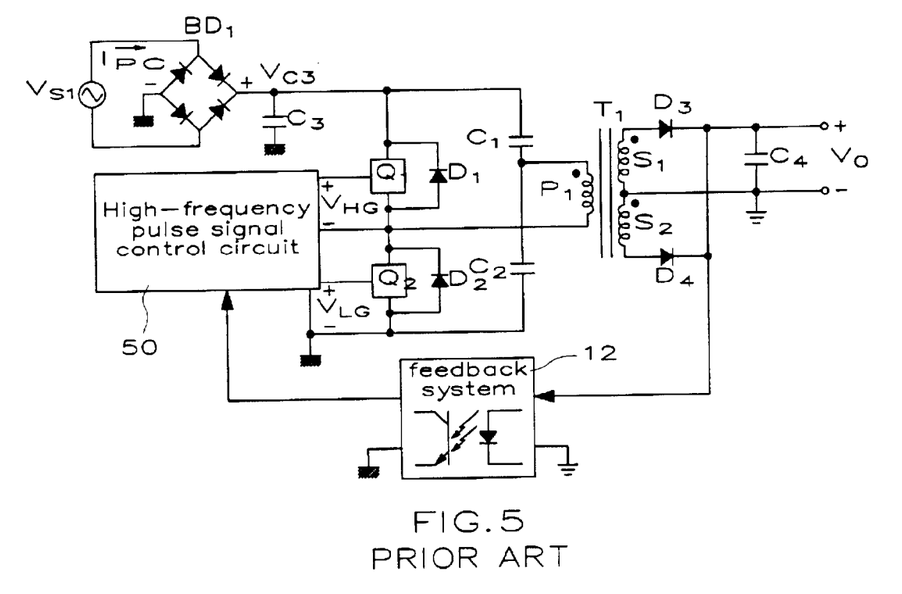
FIG. 5 is a circuit diagram of a switching power supply designed in half-bridge topology.

FIG. 5 discloses a circuit structure in which the DC/DC converter 2 shown in FIG. 1 is a half-bridge converter. In accordance with the design structure shown in FIG. 5, a bridge rectifier $BD_1$ is used to rectify the AC power $V_{S1}$. A capacitor $C_3$ is then used to filter the rectified power and generates a DC voltage $V_{C3}$. The capacitor $C_1$ and the capacitor $C_2$ are connected in a common node to form a voltage divider. Therefore, the voltage in the common node between the two capacitors is $V_{C3}/2$.

Figures 7, 8:
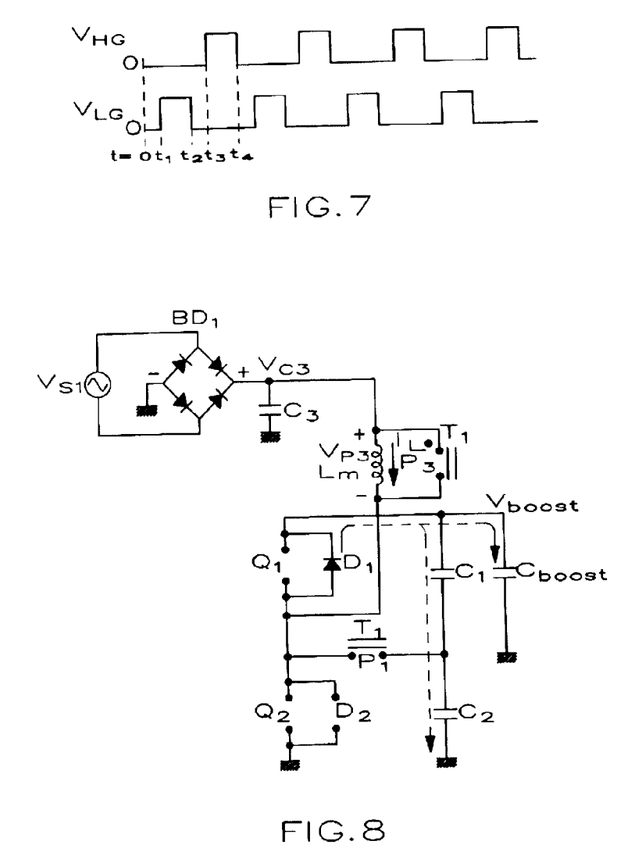
FIG. 7 is a timing diagram of the PWM signals, $V_{HG}$ and $V_{LG}$, which are usually used to drive the switching devices in conventional bridge converters.
FIG. 8 is a simplified circuit diagram of the primary-side circuit in FIG. 6*b* operating in the durations 0<t<t1 and t2<t<t3 according to FIG. 7.

FIG. 7 is a time chart for the PWM signals, $V_{HG}$ and $V_{LG}$, which are driving signals for the switch $Q_1$ and the switch $Q_2$ shown in FIG. 5, respectively. Both PWM signals $V_{HG}$ and $V_{LG}$ are low (low voltage) for $0 \leq t \leq t1$. At this time, the switch $Q_1$ and the switch $Q_2$ are both turned off. Therefore, the output voltage $V_O$ is supplied by the capacitor $C_4$.

When $t1 \leq t \leq t2$, the PWM signal $V_{LG}$ is high (high voltage) and the PWM signal $V_{HG}$ is low (low voltage). At this time, the switch $Q_1$ is turned off and the switch $Q_2$ is turned on. The current flows through the capacitor $C_1$, the primary winding $P_1$ and the switch $Q_2$ to the ground. Under this situation, the transformer transfers the power from the primary winding $P_1$ to the secondary winding $S_1$ to supply power to the capacitor $C_4$ and output a voltage $V_O$.

When $t2 \leq t \leq t3$, the switch $Q_1$ and the switch $Q_2$ are both turned off. At this time, the operation state of the circuit is same as the operation state of the circuit at $0 \leq t \leq t1$.

When $t3 \leq t \leq t4$, the PWM signal $V_{LG}$ is low (low voltage) and the PWM signal $V_{HG}$ is high (high voltage). At this time, the switch $Q_1$ is turned on and the switch $Q_2$ is turned off. Therefore, the current flows through the switch $Q_1$, the primary winding $P_1$ and the capacitor $C_2$ to the ground, The transformer transfers the power from the primary winding $P_1$ to the secondary winding $S_2$ to supply power to the capacitor $C_4$ and output a voltage $V_O$.

The power switching cycle described above is then performed repeatedly to supply power to a loading. On the other hand, the output voltage $V_O$ is transferred to a feedback system 12. The feedback system 12 feeds a signal back to the high-frequency pulse signal control circuit 50 to modify the duty cycle of the PWM signals $V_{HG}$ and $V_{LG}$. For example, if the power supplied to the load is insufficient when the output voltage is lower than a required value, the feedback signal enlarges the duty cycle of the PWM signals $V_{HG}$ and $V_{LG}$ to increase the conduction time of the switch $Q_1$ and the switch $Q_2$. Therefore, the time for transferring power from the primary winding to the secondary winding of the transformer $T_1$ is increased. In other words, the power supplied to the secondary winding is increased. The output voltage $V_O$ is therefore also increased. Finally, the output voltage $V_O$ again attains the required voltage. This means, however, that the power supplied to the load is overdriven when the output voltage is higher than the required value. In this situation, the duty cycle of the PWM signals $V_{HG}$ and $V_{LG}$ should be reduced.

Figure 2:
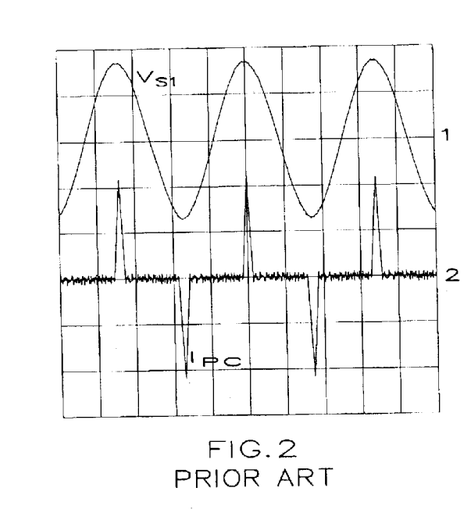
FIG. 2 is a graph showing the wave shapes of the input voltage versus the input current of FIG. 1.

Note that the input current $I_{pc}$ in FIG. 5 is a pulse current as shown in the graph of FIG. 2. The power factor of the conventional switching power supply is significantly decreased (e.g., approximately 50%) due to the distorted input current, and the total harmonics distortion (hereinafter referred as THD) is even higher than 100% after the rectification performed by the AC/DC rectifier 1 shown in FIG. 1. As a result, the total harmonics is seriously distorted, the quality is poor, and, even worse, precious energy is wasted.

Thus, many countries have promulgated a number of harmonic current rules (e.g., IEC-1000-3-2) which specify the current wave shape of the power supply for manufacturers to obey in order to improve the efficiency and quality of the power source being supplied.

As such, various designs of power factor correction circuits have been proposed by researchers in order to improve power factor of the conventional switching power supply. Two examples of typical prior art are described in the following:

1. Inductor Type Power Factor Correction Circuit

Figure 3:
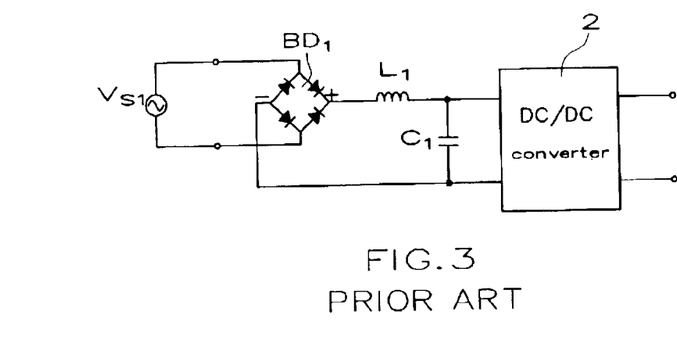
FIG. 3 is a circuit diagram of an inductor type power factor correction circuit.

As shown in FIG. 3, the prior art discloses a design in which a low frequency large winding $L_1$ is in series between a bridge rectifier $BD_1$ and an electrolytic capacitor $C_1$. The winding $L_1$ and the capacitor $C_1$ form a low pass filter to rectify the input current of a DC/DC converter 2. Such design is similar in function to the ballast for correcting the power factor of a fluorescent lamp. However, winding $L_1$ relatively large, has only a limited power factor improvement, and creates an abnormally high temperature during operation.

2. Active Type Power Factor Correction Circuit

Figure 4:
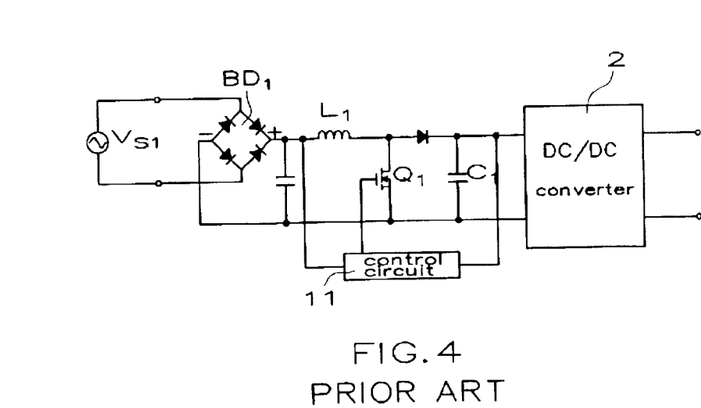
FIG. 4 is a circuit diagram of an active type power factor correction circuit.

As shown in FIG. 4, the prior art discloses a design in which the AC/DC rectifier is redesigned to form a two-stage circuit with the DC/DC converter 2. Further, a complex control circuit 11 and a large switch element $Q_1$ are added therein to improve the power factor. However, it is relatively complex in circuit design and is expensive to manufacture.

Many power factor correction circuits have been developed based on the basic concepts involved in the two examples of prior art mentioned above, and with similar drawbacks.

SUMMARY OF THE INVENTION

In accordance with the foregoing description, there are many drawbacks in the conventional power factor correction circuit. For example, the circuit structure depicted in FIG. 3 is relatively large, while the circuit structure depicted in FIG. 4 is relatively complex in circuit design and is expensive to manufacture.

Therefore, the main purpose of the present invention is to provide a power factor correction circuit with a high power factor.

Another purpose of the present invention is to provide a power factor correction circuit to solve the problems existing in the prior art.

A further purpose of the present invention is to provide a switching power supply structure that is small and economical to manufacture. It is an object of the present invention to provide a power factor correction circuit comprising a series connection of a bridge rectifier and a first capacitor. The first capacitor, a winding and a first switching device are connected in series. The first switching device is the low-side switching device in a bridge converter and is connected with a first anti-parallel diode. The first switching device, a second switching device and a second capacitor are also connected in series. The second switching device is the high-side switching device in the bridge converter and is connected with a second anti-parallel 5 diode. The second capacitor acts as a boost capacitor in the PFC circuit and provides the DC operating voltage for the bridge converter. The winding can be one additional winding of the main transformer in the bridge converter or an independent inductor. Further, the power factor of the off-line switching power supply is increased to above 0.9 by appropriately selecting the value of the first capacitor and the winding in order to comply with the requirements of Class A or Class D as stipulated in harmonic current rules IEC-1000-3-2. Furthermore, the inserted PPC circuit does not affect the normal operation of the bridge converter.

BRIEF DESCRIPTION OF THE DRAWINGS

The foregoing aspects and many of the attendant advantages of this invention will become more readily appreciated and better understood by referencing the following detailed description, when taken in conjunction with the accompanying drawings, wherein.

DETAILED DESCRIPTION OF THE PREFERRED EMBODIMENT

Without limiting the spirit and scope of the present invention, the circuit structure proposed in the present invention is illustrated with one preferred embodiment One with ordinary skill in the art, upon acknowledging the embodiment, can apply the circuit structure of the present invention to various switching power supply. The circuit structure of the present invention allows high power factor and relative small volume. Additionally, the present invention does not require an additional inductor. Therefore, the size of the circuit structure is reduced and the manufacturing cost is also reduced. The application of the present invention is not limited by the preferred embodiments described in the following.

The present invention provides a circuit structure including a power factor correction circuit and a switching power supply.

Figure 6A:
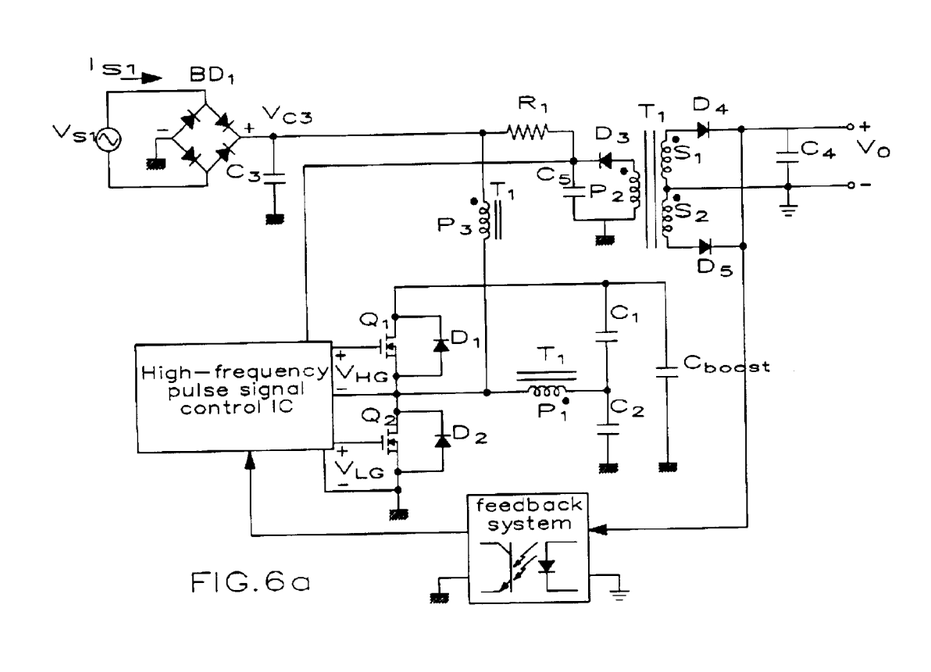
FIG. 6*a* is a circuit diagram of a preferred embodiment of the present invention.

FIG. 6*a* depicts the first preferred embodiment of the present invention. Compared to FIG. 5, the transformer $T_1$ has additional primary windings $P_2$ and $P_3$. In FIG. 6*a*, the voltage $V_{S1}$ is the AC input power. The current $I_{S1}$ is the current generated by the AC input power. The bridge rectifier $BD_1$ and the capacitor $C_3$ rectify the AC power to DC power. The high-frequency pulse signal control IC outputs the PWM signals $V_{HG}$ and $V_{LG}$ for controlling the state of the switch $Q_1$ and the switch $Q_2$. Two diodes $D_1$ and $D_2$ respectively connected in anti-parallel with the switch $Q_1$ and the switch $Q_2$. The feedback system receives the output signal, $V_O$, transferred from the output end and sends out a feedback signal to the high-frequency pulse signal control IC. Then, the high-frequency pulse signal control IC modulates the duty cycle of the PWM signals $V_{HG}$ and $V_{LG}$ to steady the output signal $V_O$.

Figure 6B:
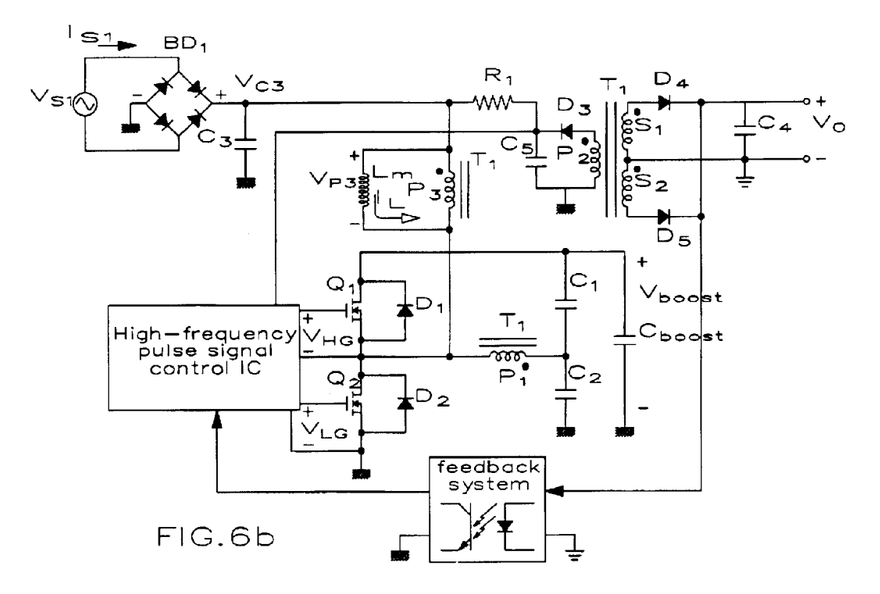
FIG. 6*b* is a effective circuit diagram of a preferred embodiment of the present invention, wherein the transformer T1 shown in FIG. 6*a* is replaced by an ideal effective transformer model.

FIG. 6*b* replaces the transformer $T_1$ depicted in FIG. 6*a* with an ideal transformer model. The windings $P_1, P_2, P_3, S_1$ and $S_2$ all are ideal coupling windings. $L_m$ is the effective magnetizing inductance referred to the $P_3$ side.

Referring to FIG. 6*b*, the transformer $T_1$ has an additional winding pair $P_2$ and $P_3$. $L_m$ is the effective magnetizing inductance referred to the $P_3$ side. On the other hand, a boost capacitor $C_{boost}$ is used in the circuit structure. Therefore, the switch $Q_2$, the diode $D_1$, the boost capacitor $C_{boost}$ and the inductor $L_m$ compose a boost circuit to perform a power factor correction function. It is noted that the waveform of the voltage $V_{C3}$ has to be a full wave to increase the efficiency of the power factor correction function and the lowest voltage value of the voltage $V_{C3}$ has to be higher than zero. Therefore, the capacitance of the capacitor $C_3$ cannot be too large. The resistor $R_1$, the capacitor $C_5$, the diode $D_3$ and the winding $P_2$ compose an auxiliary power supply to provide power for the high-frequency pulse signal control IC. Although the auxiliary power supply is not shown in FIG. 5, it is a common design in a conventional converter and, of course, it is not a block of the PFC circuit according to the present invention. The stead-state operating condition of FIG. 6*b* is described in the following paragraphs.

Under steady-state operating conditions, the boost circuit composed of the switch $Q_2$, the diode $D_1$, the boost capacitor $C_{boost}$ and the inductor $L_m$ make a voltage drop $V_{boost}$ across the capacitor $C_{boost}$ higher than the $V_{C3}$.

FIG. 7 shows a time chart of the PWM signals $V_{HG}$ and $V_{LG}$ for driving the switch $Q_1$ and the switch $Q_2$, respectively. At $0 \leq t \leq t_1$, the PWM signal $V_{HG}$ and the PWM signal $V_{LG}$ both are low (low voltage). Therefore, the switch $Q_1$ and the switch $Q_2$ both are turned off. The diode $D_1$ is forward biased. At this time, the voltage drop $V_{P3}$ across the winding $P_3$ is shown as follows:

$V_{P3} = V_{C3} - V_{boost}$

The voltage value $V_{P3}$ is less than zero because the voltage value $V_{boost}$ is larger than the voltage value $V_{C3}$. The current $I_L$ flowing through the inductor $L_m$ decreases gradually. And, the capacitor $C_1$, the capacitor $C_2$ and the capacitor $C_{boost}$ are charged by the magnetizing inductor $L_m$. At this time, no power is transferred to the load (not shown) by the transformer $T_1$. Therefore, the power required by the load is supplied by the capacitor $C_4$.

Referring to FIG. 8, a simplified circuit diagram of the primary-side circuit is shown without the part of the auxiliary power supply. The dotted line in FIG. 8 indicates the flowing direction for current $I_L$ at $0 \leq t \leq t_1$. It is noted that the transformer $T_1$ is simplified to an ideal model. The symbol $L_m$ means the magnetizing inductor and the windings $P_1$, $P_2$, $P_3$, $S_1$ and $S_2$ shown in the FIG. 6b only perform a coupling function.

At $t_1 \leq t \leq t_2$, the PWM signal $V_{LG}$ is high (high voltage) and the PWM signal $V_{HG}$ is low (low voltage). At this time, the switch $Q_1$ is turned off and the switch $Q_2$ is turned on. The diode $D_1$ is reverse biased. At this time, the voltage drop $V_{P3}$ across the winding $P_3$ is shown as follows:

$$V_{P3} = V_{C3}$$

The voltage $V_{C3}$ is larger than zero. Therefore, the current $I_L$ flowing through the inductor $L_m$ increases gradually. Therefore, the voltage $V_{C3}$ charges the inductor $L_m$. On the other hand, the capacitor $C_{boost}$ is discharged through the capacitor $C_1$, the winding $P_1$ and the switch $Q_2$. The capacitor $C_2$ is also discharged through the winding $P_1$ and the switch $Q_2$. At this time, the power is transferred from the primary winding $P_1$ to the secondary winding $S_1$. Then, the power is supplied to the load (not shown) and the capacitor $C_4$ from the secondary winding $S_1$.

Figure 9:
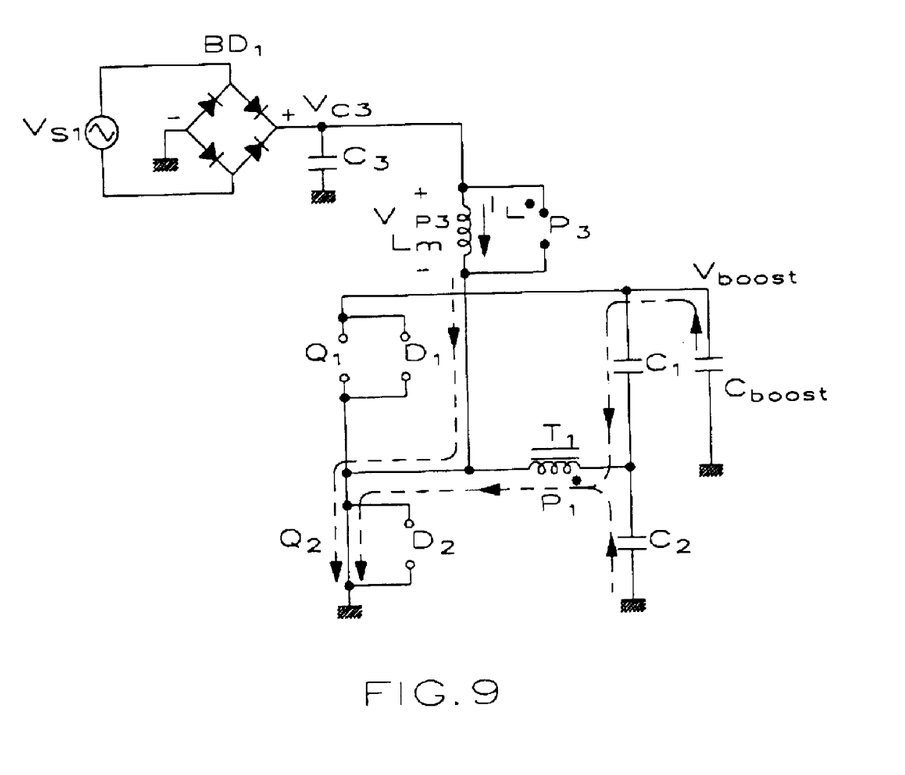
FIG. 9 is a simplified circuit diagram of the primary-side circuit in FIG. 6*b* operating in the duration t1<t<t2 according to FIG. 7.

Referring to FIG. 9, a simplified circuit diagram of the primary-side circuit is shown without the part of the auxiliary power supply. The dotted line depicted in FIG. 9 indicates the flowing direction for current $I_L$ at $t_1 \leq t \leq t_2$.

At $t_2 \leq t \leq t_3$, the PWM signal $V_{HG}$ and the PWM signal $V_{LG}$ both are low (low voltage). Therefore, the switch $Q_1$ and the switch $Q_2$ are both turned off. The diode $D_1$ is turned on. At this time, the voltage drop $V_{P3}$ across the winding $P_3$ is shown as follows:

$$V_{P3} = V_{C3} - V_{boost}$$

The voltage value $V_{P3}$ is less than zero because the voltage value $V_{boost}$ is larger than the voltage value $V_{C3}$. The current $I_L$ flowing through the inductor $L_m$ decreases gradually. At this time, the operating condition of the circuit is the same as that of the circuit at $0 \leq t \leq t_1$. The simplified circuit diagram is also same as FIG. 8.

At $t_3 \leq t \leq t_4$, the PWM signal $V_{LG}$ is low (low voltage) and the PWM signal $V_{HG}$ is high (high voltage). The switch $Q_1$ is turned on and the switch $Q_2$ is turned off. The diode $D_1$ is reverse biased. At this time, the voltage drop $V_{P3}$ across the primary winding $P_3$ is shown as follows:

$$V_{P3} = V_{C3} - V_{boost}$$

The voltage value $V_{P3}$ is less than zero because the voltage value $V_{boost}$ is larger than the voltage value $V_{C3}$. The current $I_L$ flowing through the inductor $L_m$ decreases gradually. Therefore, the magnetizing inductor $L_m$ continues discharging through the primary winding $P_1$ and the capacitor $C_2$. On the other hand, the capacitor $C_{boost}$ and the capacitor $C_1$ are both discharged through the switch $Q_1$, and the primary winding $P_1$. During this time, the capacitor $C_2$ is charged and power is transferred from the primary winding $P_1$ to the secondary winding $S_2$. Then, the power is supplied to the load (not shown) and the capacitor $C_4$ from the secondary winding $S_2$.

Figure 10:
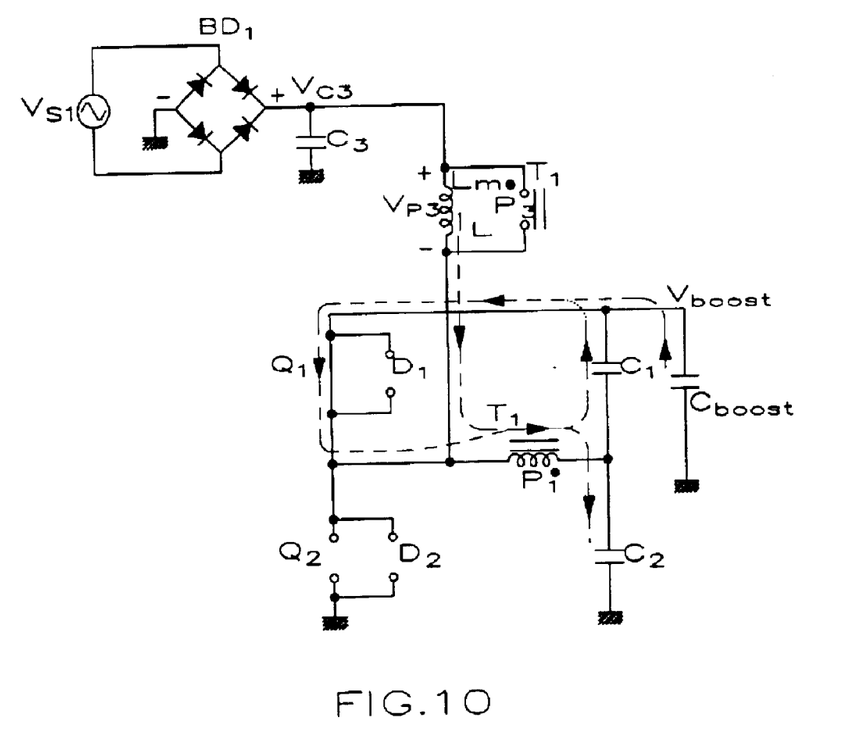
FIG. 10 is a simplified circuit diagram of the primary-side circuit in FIG. 6*b* operating in the duration t3<t<t4 according to FIG. 7.

Referring to FIG. 10, a simplified circuit diagram of the primary-side circuit without the part of the auxiliary power supply is shown. The dotted line depicted in FIG. 10 indicates the flowing direction for current $I_L$ at $t_3 \leq t \leq t_4$.

Then, the power switching cycle ($0 \leq t \leq t_4$) described in the above is repeated to supply power to a load. On the other hand, the output voltage $V_O$ is transferred to a feedback system. The feedback system feeds a signal back to the high-frequency pulse signal control IC to modify the duty cycle of the PWM signals $V_{HG}$ and $V_{LG}$. For example, if the power supplied to the load is insufficient when the output voltage is lower than the specific value, the feedback signal enlarges the duty cycle of the PWM signals $V_{HG}$ and $V_{LG}$ to increase the conduction time of the switch $Q_1$ and the switch $Q_2$. Therefore, the time for transferring power from the primary winding to the secondary winding of the transformer $T_1$ is increased. In other words, the power supplied to the secondary winding is increased Therefore, the output voltage $V_O$ is also increased. Finally, the output voltage $V_O$ again attains the specific value. However, the power supplied to the load is overdriven when the output voltage is higher than the specific value. In this situation, the duty cycle of the PWM signals $V_{HG}$ and $V_{LG}$ should be reduced.

Figure 11A:
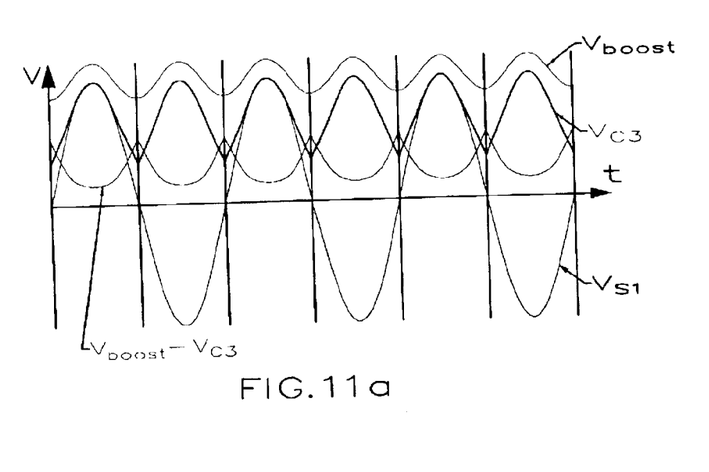
FIG. 11*a* is a graph showing the waveforms of the critical voltages in FIG. 6*b* in order to describe the power factor correction ability of the present invention.

FIG. 11a is a graph showing the waveforms of the critical voltages, $V_{C3}$, $V_{boost}$, $V_{S1}$ and $V_{boost} - V_{C3}$, in FIG. 6b in order to describe the power factor correction ability of the present invention. In accordance with the above description and the time chart depicted in FIG. 7, the current $I_L$ flowing through the inductor $L_m$ increases gradually only when the switch $Q_2$ is turned on at $t_1 \leq t \leq t_2$ because the voltage value $V_{P3}$ is equal to $V_{C3}$ and $V_{C3}$ is larger than zero. At other times, $0 \leq t \leq t_1$, $t_2 \leq t \leq t_3$ and $t_3 \leq t \leq t_4$, the current $I_L$ flowing through the inductor $L_m$ decreases gradually because the voltage value $V_{P3}$ is equal to $V_{C3} - V_{boost}$ and $V_{C3} - V_{boost}$ is less than zero.

Figure 11B:
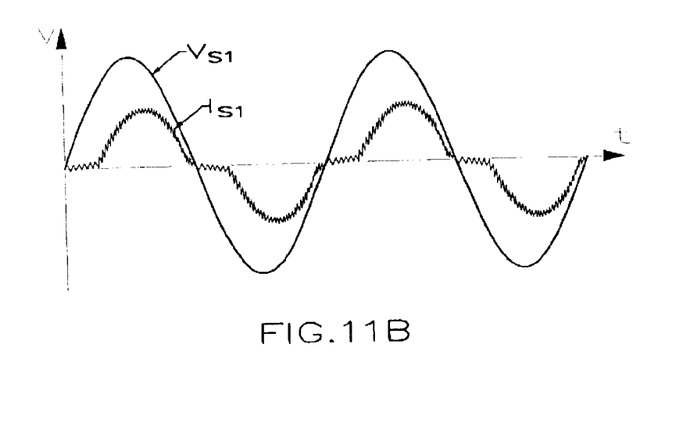
FIG. 11*b* is a graph showing the waveforms of the input voltage and current in the embodiment shown in FIG. 6*b;*

FIG. 11b is a graph showing the waveforms of the input voltage and current in the embodiment shown in FIG. 6b. The waveform of the input current $I_{S1}$ can be derived from the following description according to the timing diagram shown in FIG. 7. It is noted that the input current $I_{S1}$ is approximately equal to the current $I_L$, because the capacitance of $C_3$ is small enough. If $\Delta t_1 = t_2 - t_1$, then, at $\Delta t_1$, switch $Q_2$ is turned on and the voltage value $V_{P3}$ is equal to $V_{C3}$.

And if $\Delta t_2 = t_4 - \Delta t_1$, then, at $\Delta t_2$, the voltage Value $V_{P3}$ is equal to ($V_{C3} - V_{boost}$), In accordance with the following equation for inductor:

$$V = L \frac{di}{dt} \quad di = \frac{V \cdot dt}{L} \quad (1)$$

When the value of $\Delta t$ and $\Delta I_L$, is almost zero, equation (1) becomes the following equation:

$$\Delta I_L = \frac{V \cdot \Delta t}{L_m} \quad (2)$$

When the voltage value of $V_{C3}$ is at the lowest level, the voltage value of ($V_{boost} - V_{C3}$) is larger than the $V_{C3}$ in accordance with FIG. 11a. On the other hand, the value of $\Delta t_2$ is also larger than the value of $\Delta t_1$. Therefore, the following equation can be derived:

$$(V_{C3} \times \Delta t_1) < [(V_{boost} - V_{C3}) \times \Delta t_2] \quad (3)$$

$$\frac{V_{C3} \cdot \Delta t_1}{L_m} < \frac{(V_{boost} - V_{C3}) \cdot \Delta t_2}{L_m} \quad (4)$$

$L_m$ is a constant. In accordance with equation (4), the current difference at $\Delta t_1$ is less than the current difference at $\Delta t_2$, but these two values are getting closer as $V_{C3}$ rising. Therefore, the current $I_{S1}$ presents a vibration curve around zero ampere when the voltage $V_{S1}$ is rising from zero voltage as shown in FIG. 11b.

Then, the current difference at $\Delta t_1$ is larger than the current difference at $\Delta t_2$ after the following equation (5) is derived:

$$(V_{C3} \times \Delta t_1) = [(V_{boost} - V_{C3}) \times \Delta t_2] \quad (5)$$

Therefore, the current $I_{S1}$ begins to rise as shown in FIG. 11b.

After the peak value of $V_{C3}$ is arrived, the value of $V_{C3}$ starts to fall and the value of $(V_{boost}-V_{C3})$ starts to rise. At this time, the value of the $(V_{C3} \times \Delta t_1)$ is still larger than the value of the $(V_{boost}-V_{C3}) \times \Delta t_2$. Therefore, the current ail still rises as shown in FIG. 11b.

In the situation where the value of $(V_{C3} \times \Delta t_1)$ is again equal to the value of the $(V_{boost}-V_{C3}) \times \Delta t_2$, the current difference at $\Delta t_1$ is less than the current difference at $\Delta t_2$ again. Therefore, the current $I_{S1}$ begins to decrease as shown in FIG. 11b. Compared to FIG. 2, the waveform of the input current in FIG. 11b is an improvement.

In accordance with the above analysis, the switch $Q_2$, the diode $D_1$, the boost capacitor $C_{boost}$ and the inductor $L_m$ together compose a boost circuit to perform a power factor correction function. The operation method is similar to the operation method for the boost circuit shown in FIG. 4. Therefore, the present invention raises the power factor and the operation of the bridge converter is not disturbed. In accordance with the prior art depicted in FIG. 4, an additional control circuit is required to control the switch $Q_1$. However, in the present invention, the switch $Q_2$ is controlled by the high-frequency pulse signal control IC which belongs to the half-bridge converter. In other words, the present invention does not require an additional control circuit. On the other hand, the present invention also does not require the switch $Q_1$ shown in FIG. 4. Therefore, the present invention reduces the manufacturing costs.

Figure 13:
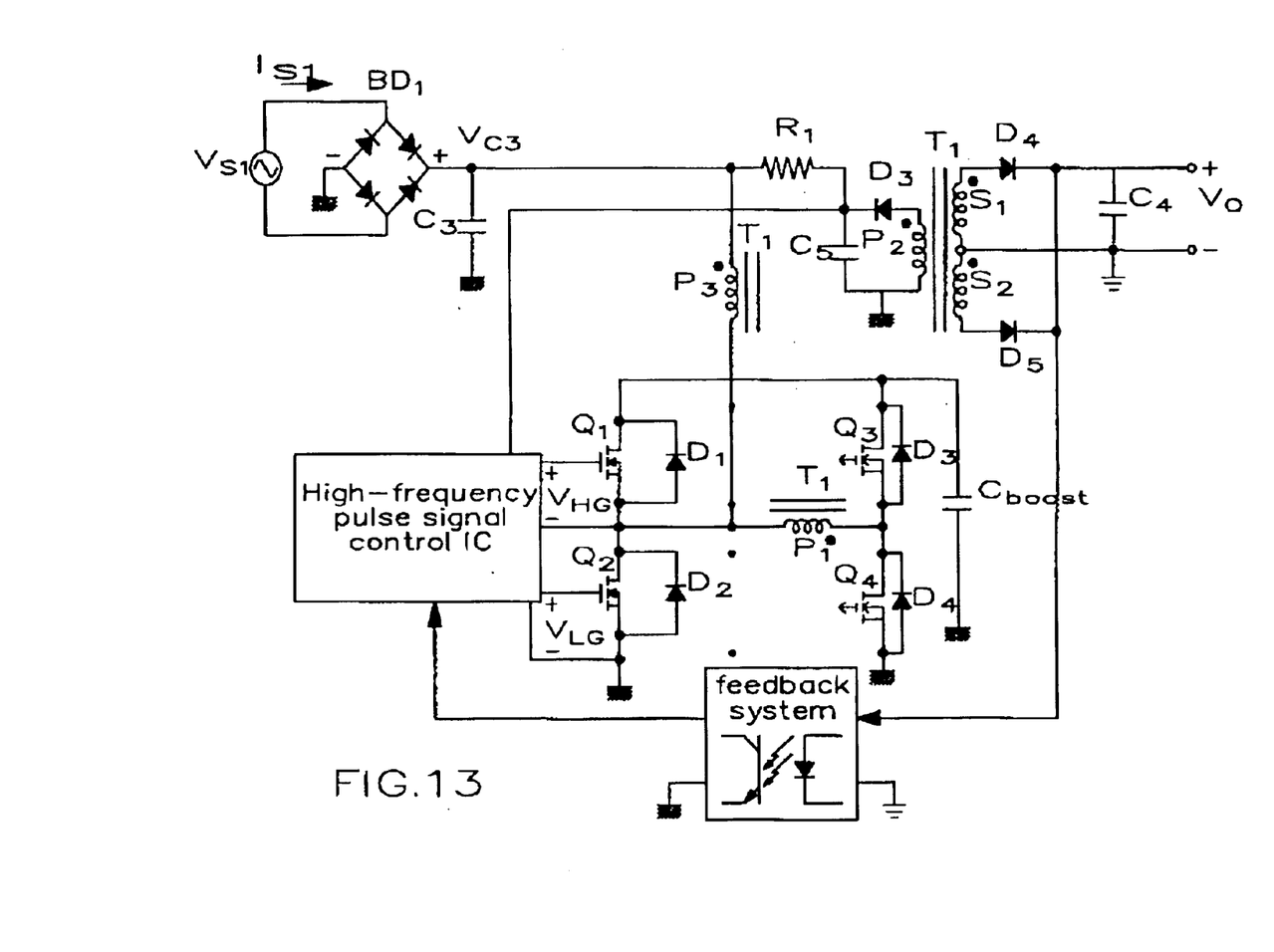
FIG. 13 is a circuit diagram of a switching power supply designed in full-bridge topology according to the preferred embodiment of the present invention.

FIG. 13 illustrates a circuit diagram of a switching power supply designed in full-bridge topology according to the preferred embodiment of the present invention The main difference between the half-bridge converter and the full-bridge converter is that the capacitor $C_1$ and the capacitor $C_2$ shown in FIG. 6a are replaced by the switch devices $Q_3$ and $Q_4$ in the full-bridge converter. The two switch devices $Q_3$ and $Q_4$ are also controlled by the high-frequency pulse signal control IC. Two diodes $D_3$ and $D_4$ respectively connected in anti-parallel with these two switches $Q_3$ and $Q_4$. Therefore, the circuit structure of the present invention may also be used in the full-bridge converter. The operation method is similar to that described above.

Figure 12:
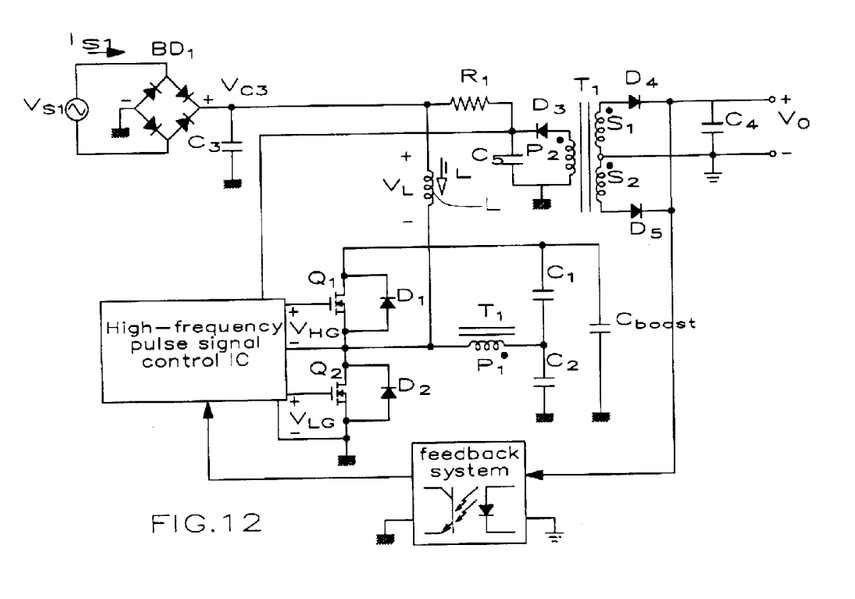
FIG. 12 is a circuit diagram of a second embodiment of the present invention.

On the other hand, referring to FIG. 12, a circuit structure of another embodiment of the present invention is shown. Because the present invention only utilizes the magnetizing inductor of the winding $P_3$ shown in FIG. 6a, the winding $P_3$ can be replaced by an inductor as shown in FIG. 12. The operation method of the circuit structure shown in FIG. 12 is the same as the operation method of the circuit shown in FIG. 6a. Similarly, a full-bridge converter may also be used to replace the half-bridge converter shown in FIG. 12.

It is noted that some half-bridge converters (e.g., resonant half-bridge converters) do not include the upper capacitor $C_1$. However, this kind of half-bridge topology may also be used in the present invention.

As is understood by a person skilled in the art, the foregoing descriptions of the preferred embodiment of the present invention are an illustration of the present invention rather than a limitation thereof. Various modifications and similar arrangements are included within the spirit and scope of the appended claims. The scope of the claims should be accorded to the broadest interpretation so as to encompass all such modifications and similar structures. While a preferred embodiment of the invention has been illustrated and described, it will be appreciated that various changes can be made therein without departing from the spirit and scope of the invention.

What is claimed is:

1. A power factor correction circuit for improving a power factor of a switching power supply, wherein said switching power supply is composed of said power factor correction circuit and a converter, said circuit comprising:
   a rectifier;
   a first winding connected with said rectifier;
   two switch devices connected in series and having a first common node and a first non-grounded end;
   two diodes respectively connected in anti-parallel with said two switch devices;
   a second winding connected with said first common node, wherein said first winding and said second winding both are primary windings of a transformer of said converter;
   two capacitors connected in series and having a second common node and a second non-grounded end, wherein said second common node is connected to said first common node through said second winding and said second non-grounded end is connected with said first non-grounded end directly; and
   a third capacitor connected with said first non-grounded and said second non-grounded end.

2. The power factor correction circuit of claim 1, wherein said circuit further comprises a control circuit to control the switching state of said two switch devices.

3. The power factor correction circuit of claim 2, wherein said control circuit is the control circuit of said converter.

4. The power factor correction circuit of claim 1, wherein said two switch devices are the switch devices of said converter.

5. The power factor correction circuit of claim 1, wherein said two diodes conduct in a same direction.

6. The power factor correction circuit of claim 2, wherein said converter is a half-bridge converter.

7. The power factor correction circuit of claim 1, wherein said switch device is a transistor.

8. A power factor correction circuit for improving a power factor of a switching power supply, wherein said switching power supply is composed of said power factor correction circuit and a converter, said circuit comprising:
   a rectifier;
   a first winding connected with said rectifier;
   two switch devices connected in series and having a common node and a non-grounded end;
   two diodes respectively connected in anti-parallel with said two switch devices;
   a second winding connected with said common node, wherein said first winding and said second winding both are primary windings of a transformer of said converter;
   a first capacitor connected to said common node through said second winding; and
   a second capacitor connected with said non-grounded end.

9. The power factor correction circuit of claim 8, wherein said circuit further comprises a control circuit to control the switching state of said two switch devices.

10. The power factor correction circuit of claim 9, wherein said control circuit is the control circuit of said converter.

11. The power factor correction circuit of claim 8, wherein said two switch devices are switch devices of said converter.

12. The power factor correction circuit of claim 8, wherein said two diodes conduct in a same direction.

13. The power factor correction circuit of claim 8, wherein said converter is a half-bridge converter.

14. The power factor correction circuit of claim 10, wherein said switch device is a transistor.

15. A power factor correction circuit for improving a power factor of a switching power supply, wherein said switching power supply is composed of said power factor correction circuit and a converter, said circuit comprising:

a rectifier;

a first winding connected with said rectifier;

first and second switch devices connected in series and having a first common node and a first non-grounded end;

first and second diodes respectively connected in anti-parallel with said first and second switch devices;

a second winding connected with said first common node, wherein said first winding and said second winding both are primary windings of a transformer of said converter;

third and fourth switch devices connected in series and having a second common node and a second non-grounded end, wherein said second common node is connected to said first common node through said second winding and said second non-grounded end is connected with said first non-grounded end directly;

third and fourth diodes respectively connected in anti-parallel with said third and fourth switch devices; and a first capacitor connected with said first non-grounded end and said second non-grounded end.

16. The power factor correction circuit of claim 15, wherein said circuit further comprises a control circuit to control the switching state of said first, second, third and fourth switch devices.

17. The power factor correction circuit of claim 16, wherein said control circuit is a control circuit of said converter.

18. The power factor correction circuit of claim 15, wherein said first and second diodes conduct in a same direction.

19. The power factor correction circuit of claim 15, wherein said third and fourth diodes conduct in a same direction.

20. The power factor correction circuit of claim 15, wherein said converter is a full-bridge converter.

* * * * *